United States Patent [19]
Poupin et al.

[11] 3,854,567

[45] Dec. 17, 1974

[54] DEVICE FOR CONVEYING ROD-SHAPED OBJECTS SUCH AS CIGARETTES

[75] Inventors: Raymond Poupin, Fleury-Les-Aubrais; Henri Anfossi, Orleans, both of France

[73] Assignee: Service D'Exploitation Industrielle Des Tabacs Et Des Allumettes, Paris, France

[22] Filed: Dec. 20, 1971

[21] Appl. No.: 210,029

[30] Foreign Application Priority Data
Dec. 23, 1970 France .............................. 70.46369

[52] U.S. Cl. .................................. 198/20 C, 198/21
[51] Int. Cl. ............................................ B65g 47/00
[58] Field of Search............ 198/102, 20 C, 203, 21, 198/22, 34, 165, 20 R; 271/74

[56] References Cited
UNITED STATES PATENTS
| | | | |
|---|---|---|---|
| 1,769,818 | 7/1930 | Anderson............................ | 198/203 |
| 3,301,199 | 1/1967 | Vassalli................................. | 198/21 |
| 3,529,713 | 9/1970 | Poupin................................. | 198/165 |

*Primary Examiner*—Evon C. Blunk
*Assistant Examiner*—Joseph E. Valenza

[57] ABSTRACT

In a device for conveying substantially cylindrical rod-shaped objects, such as cigarettes, of the type comprising at least one upstream smooth conveyor unit on which the objects are fed cross-wise with respect to their longitudinal axis, and a smooth and perforated downstream conveyor unit, and suction means associated with said downstream conveyor unit so as to exert on the objects which it drives, a force pressing them against it, said downstream unit having a path such that an object driven by the upstream unit is, in a certain zone, both attracted against said downstream unit and subjected to an antagonistic force which draws it away from said downstream unit, means for coupling at the latest in said zone in which said antagonistic force acts, groups of a number of objects such as to provide for the feeding by said downstream unit of said groups of objects thus constituted.

1 Claim, 2 Drawing Figures

DEVICE FOR CONVEYING ROD-SHAPED OBJECTS SUCH AS CIGARETTES

This invention relates to a device for conveying rod-shaped objects which are substantially cylindrical such as cigarettes, of the type comprising at least one upstream smooth conveyor unit on which the objects are driven crosswise with respect to their longitudinal axis, and one smooth and perforated downstream conveyor unit, and suction means associated with said downstream conveyor unit so as to exert on the objects which it drives, a force which presses them against it, said downstream unit describing a path such that an object driven by the upstream unit is, in a certain zone, both attracted to said downstream unit and subjected to an antagonistic force which draws it away from said downstream unit.

When the throughput and feeding rate of the objects are high, devices of this type have disadvantages. Rebounds, overlaps, tight packing and slantwise positioning of these objects occur frequently.

These disadvantages could, in certain cases, be eliminated through the use of conveying surfaces with transversal cavities having a diameter, corresponding or not, to that of the objects, the suction being exerted on the inside of these cavities. The use of such surfaces, which are known, in particular, in grooved cylinders, leads to a device whose construction is much more complicated, requiring a rigorous synchronism of the conveyors and which raises the delicate problem, in the case of high speeds, of distribution of the objects into the cavities.

In order to avoid said drawbacks, provision is made, according to the invention, for using a device of the type defined in the first few lines of this disclosure, provision being made for means designed to ensure, at the latest, in said zone, in which said antagonistic force acts, the formation, though coupling, of group of objects side by side, the number of objects in these groups being such that it provides for the feeding of said groups of objects thus formed by said downstream unit.

This invention is based on the following observation: when a series of objects, moved by the feeding means, consists of joined objects, no means is required to effect their feeding on the path; even the first object of such a series of joined objects follows perfectly the path of the downstream conveyor.

This fact is explained as follows:

When an isolated object is brought into contact with a perforated conveyor, the sucking force is exerted over an extremely small surface corresponding at the most to a small surface close to its contact generatrix. The object leaves the conveyor as soon as a slight antagonistic force acts upon it. When two jointed objects are brought into contact with this conveyor, the sucking force is exerted on a surface which extends from the contact generatrix of one to the contact generatrix of the other and passes through their coupling line. This surface which is substantial with respect to the preceding one, experiences strong suction and the force which thus presses them on the conveyor opposes the antagonistic forces which move them away from the path. Depending on the value and direction of these antagonistic forces, the group comprising the two joined objects may or may not remain on the path. If the force maintaining them on the latter is still insufficient, a third object can join the two preceding ones thus doubling the surface over which the sucking effect is exerted.

Consequently, depending on the forces to be overcome in order to maintain the objects on the path, groups of a suitable number of joined objects are simply provided so as to obtain a perfect operation.

The joining means comprise, for example, means for braking the object or objects to be joined to the following one or ones.

Numerous means can be used to exert such a braking action. These means, which may be mechanical or pneumatic, have numerous disadvantages for objects placed on a conveyor, due to the shape of the objects which are cylindrical rods, and also, to the degree of precision according to which the braking means must operate in a selective manner.

As far as the first point is concerned, it should be noted firstly that the objects under consideration have a tendency to roll as soon as they are subjected to a braking action, and secondly, that the means must lead to the coupling of the objects in a position such that their ends are substantially aligned parallel to the direction of motion of the conveyor and, finally, that these means, if the objects are to be fed on a curvilinear path of the downstream conveyor, must also join them in a position such that their longitudinal axis will be perpendicular to their direction of motion.

As far as the second point is concerned, it should be noted that the means must be active with respect to the isolated objects, or objects which are jointed in an insufficient number to those preceding them, and inactive on the objects joined in a sufficient number.

The selection is all the more difficult as the objects are lighter.

A characteristic of this invention consists in combining the above-mentioned mechanical or pneumatic means with the suction means of the conveyor with which the objects to be regrouped are in contact. It was seen previously that the suction force has an effect which increases in substantial proportions depending on whether it acts on an isolated cigarette, on two and then three joined cigarettes. Much larger selection ranges are thus available in which the range of action of the braking means can be set for a number of objects such that the suction force exerted on the group of joined objects becomes greater than the force which tends to draw them away from the path.

These means can be provided, either facing the downstream conveyor in the zone in which is exerted the force tending to draw the objects away, or facing the feeding means of the above-mentioned conveyor.

The paths of these conveyors may be horizontal, upward or downward; these paths may be plane or curvilinear; the conveying surface may be the lower face or upper face of a conveyor belt.

Depending on the conveying conditions, a suitable braking means shall be chosen.

Where regrouping operations are to be effected on the upward curvilinear path of a perforated downstream conveyor, for example, on an endless conveyor belt around its guide pulley where the objects are brought by the feeding means, the braking means can be provided by a shell adjacent by its upward end to the feeding means, said shell being concentric with the path and at a distance from the downstream conveyor having a value substantially greater than the diameter of the objects. In this manner, the isolated objects, launched successively by the feeding means between the curvilinear conveyor and the shell are braked and maintained on this path on which they are joined until the moment at which the suction force is exerted on the group with sufficient strength. The length of the shell will be determined taking into account the number of objects to be joined.

It will noted that the objects joined in a sufficient number as they are brought on the curvilinear path remain joined on the latter and are thus fed by the perforated belt without any interference from the shell.

Pneumatic means may however be preferred to the shell, whose efficiency cannot be perfect due to the fact that the channel it describes must be slightly larger than the diameter of the objects, which pneumatic means consist of air blasts converging towards the conveying face in the zone in which the spreading force is exerted. These air blasts immobilize and apply to the conveyor the object arriving alone in this zone up to the moment at which the suction force applied on the group of objects becomes greater than the antagonistic force of the air blasts, which leads to feeding of the group by the conveyor.

A certain number of examples of devices according to the invention, which are in no way a limitation, are shown in the appended drawing, in which.

In all these figures, similar components bear the same reference numbers.

Figure 1:
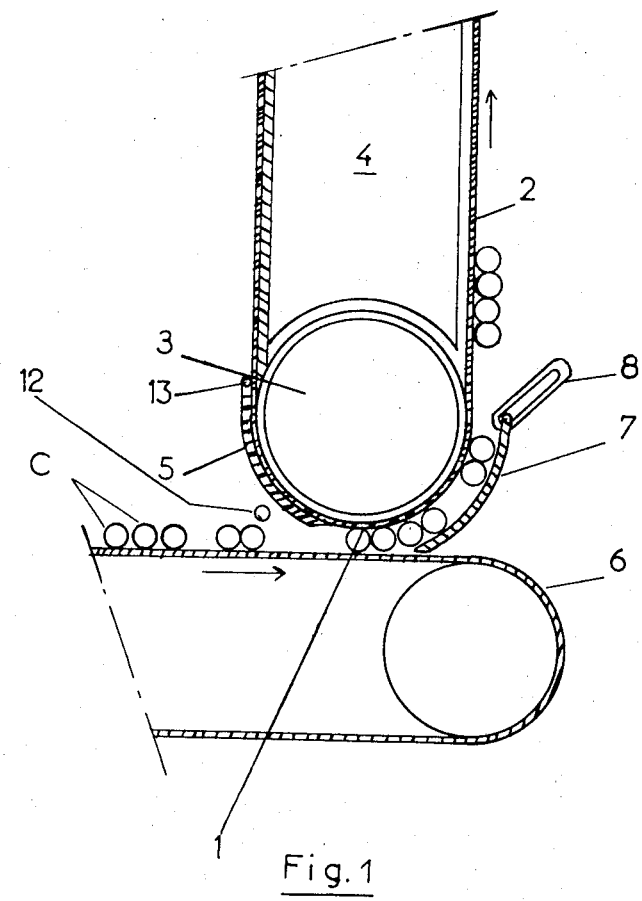
FIG. 1 is a sectional view of the shell device.

In the example of FIG. 1, endless downstream conveyor 2, comprising a perforated belt, is guided by pulley 3. Belt 2, in its upward part, as well as in its curvilinear part around pulley 3, is put into communication with a suction chamber 4. To this effect, pulley 3 comprises circular grooves in which the air drawn in through the perforations in belt 2 can circulate towards chamber 4. In order to limit the suction effect at the level of the pulley, in its upward part, a flap 5, maintained at 13, and consisting of a sheet of flexible material, impervious to air, is applied, simply as a result of the suction, along approximately the lower quarter of pulley 3.

The endless upstream conveyor 6, comprising a belt, moves as indicated by the arrow. The plane of its upper driving side is separated from point 1, which is the lowest point in the path of belt 2, by a distance whose value is slightly greater than the diameter of the objects which, in this case, are assumed to be cigarettes. Conveyor 6 is the feeding conveyor.

Conveyor 6 passes under the upstream part of a shell 7 which is substantially concentric with the curvilinear path of belt 2 in its upward part. The distance between these two curved surfaces is substantially equal to the diameter of the cigarettes. This shell can go up again in slideway 8 through a mechanical system (not shown) in order to liberate the passage on the horizontal belt, in case of failures in response to a failure detector 12 provided above the plane of the objects conveyed on belt 6.

In this example, cigarettes C are fed by conveyor 6 which moves, in this example, at a very high speed; the device according to the invention easily accepts throughputs corresponding to those of recent cigarette machines, as high as 4000 cigarettes/minute. Cigarettes C are conveyed, under the impulse of their kinetic energy, into shell 7.

If a cigarette reaches this level individually, its velocity becomes nil and it remains there; it will not be driven by belt 2 due, on the one hand, to the speed of this conveyor and, on the other hand, to the relative weakness of suction and the reduced surface of the cigarette on which the suction can be exerted. The next cigarette will join it, followed by another, until several joined cigarettes constitute a surface such that the effect of suction will be exerted on the group, whether or not there is a conicidence between the generatrix of each cigarette and a perforation line.

This arrangement has an additional advantage in that any isolated cigarette which arrives under pulley 3 in an oblique position, i.e., with its axis not parallel with the axis of the pulley, will be automatically straightened out. However, this will not be the case for a cigarette whose axis is oriented parallel to the direction of motion of belt 6. For this reason, it is preferred, in the case of FIG. 1, that the shell comprise two inclines between which such a cigarette will be automatically discharged.

In the case of tight packing at the level of detector 12, induced, for example, by a series of contiguous cigarettes oriented in an oblique direction, the accumulation at the level of the detector controls the temporary lifting of shell 7. The cigarettes inducing the tight packing are thus automatically discharged.

Figure 2:
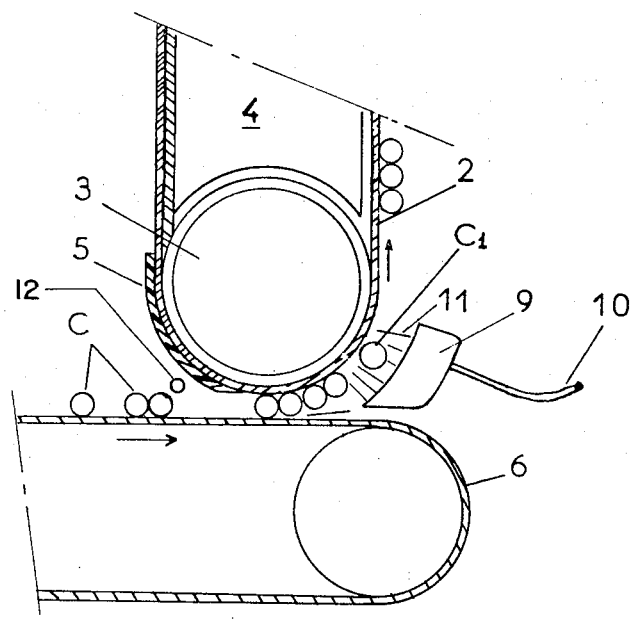
FIG. 2 is a sectional view of another embodiment of the converging air blast device.

In the example of FIG. 2, the same components as the example of FIG. 1 are found again, but the shell has been replaced by a blowing device 9 fed with compressed air through duct 10. The flow rates of blasts 11 are adjusted so as to maintain the cigarettes isolated in equilibrium while waiting for the arrival of the following ones.

Cigarettes C, arriving through conveyor 6, are received by air blasts 11. In case of tight packing at the level of detector 12, the accumulation controls the retraction of nozzle 9 and the cigarettes causing the tight packing are thus automatically discharged.

In this embodiment, it should be noted that the obstacle consisting of blown air from nozzles 9 has no effect on a cigarette whose axis is oriented parallel to the direction of motion of belt 6, and such a cigarette will therefore be discharged automatically.

What we claim is:

1. A device for conveying and grouping substantially rod-shaped articles comprising first, upstream, smooth conveyor means for carrying a single layer of said rod-shaped articles and second, downstream, smooth conveyor means, said second conveyor means having a perforated conveying surface and associated suction means operable to urge said rod-shaped articles into contact with the conveying surface of said second conveyor means, said first and second conveyor means being disposed, relative to one another, so as to define a transferral zone in which rod-shaped articles disposed cross-wise on the conveying surface of said first conveyor means are transferred to the conveying surface of said second conveyor means by the urging of said suction means, and braking means downstream of said transferral zone comprising a source of air current so disposed as to deliver said air current in opposition to the direction of passage of said rod-shaped articles exiting from said transferral zone, said braking means being operable to delay the passage of single, ungrouped rod-shaped articles on said second conveyor means downstream from said transferral zone until parallel to and contiguously grouped with at least one other rod-shaped article and to permit a plurality of such parallel and contiguously grouped rod-shaped articles to be conveyed by said second conveyor means.

* * * * *